(12) United States Patent
Lyons et al.

(10) Patent No.: US 6,176,782 B1
(45) Date of Patent: Jan. 23, 2001

(54) MOTION-BASED COMMAND GENERATION TECHNOLOGY

(75) Inventors: Damian M. Lyons, Putnam Valley, NY (US); Thomas G. Murphy, Manchester, NH (US)

(73) Assignee: Philips Electronics North America Corp., New York, NY (US)

( * ) Notice: Under 35 U.S.C. 154(b), the term of this patent shall be extended for 0 days.

(21) Appl. No.: 08/995,823

(22) Filed: Dec. 22, 1997

(51) Int. Cl.$^7$ .................................................. G06F 3/00
(52) U.S. Cl. ........................ 463/36; 345/358; 434/367
(58) Field of Search ............................ 345/358, 121, 345/156, 127, 131; 382/313; 600/587; 353/52; 434/410, 379, 307 R, 308 R, 309, 314, 323, 324, 365, 367, 408, 428–9, 430

(56) References Cited

U.S. PATENT DOCUMENTS 5,528,263   6/1996   Platzker et al. .
5,686,940 * 11/1997   Kuga ..................................... 345/156

FOREIGN PATENT DOCUMENTS

0571702A2   1/1993   (EP) ................................. G06F/3/00
WO9630856  10/1996   (WO) .

* cited by examiner

*Primary Examiner*—Peter Vo
*Assistant Examiner*—John Paradiso
(74) *Attorney, Agent, or Firm*—Gregory L. Thorne

(57) ABSTRACT

The system displays on a screen a set of options that are selectable by a user. The user standing in front of the screen points at a desired option and a camera of the system takes an image of the user while pointing. The system calculates from the pose of the user in the image whether the user is pointing to any of the displayed options. If such is the case, that particular option is selected and an action corresponding with that option is executed. This known housing has radially resilient clamping limbs arranged in a circle and having radially outward clamping surfaces for engagement in a central opening of a disc-shaped information carrier.

2 Claims, 4 Drawing Sheets

MOTION-BASED COMMAND GENERATION TECHNOLOGY

BACKGROUND OF THE INVENTION

The invention relates a method for enabling a user to select a particular option from a set of selectable options, the method including the steps of:

displaying the set of selectable options at respective option positions;

while allowing the user to physically point at the particular option, taking an image of the user;

ascertaining from the image whether the user points at the particular option; and if such is the case, concluding that the user has selected the particular option.

The invention further relates to a system for enabling a user to select a particular option from a set of selectable options, the system including:

a video screen for displaying the set of selectable options at respective option positions;

a camera for taking an image of the user;

an ascertaining unit for ascertaining from the image whether the user points at the particular option; and a concluding unit for concluding that the user has selected the particular option, in the case that the ascertaining means have ascertained that the user points at the particular option.

Such a method and system are described in U.S. Pat. 5,528,263. The known system has a projector to project a video image having one or more selectable options, there called buttons, onto a projection screen. The system comprises a camera that records an image of the image projected on the screen. Furthermore, the system is arranged to compare the camera recorded image with the original image fed to the projector. A user standing next to the projected image interacts with the system by covering the particular selectable option with an object that causes a different light reflection than the projection screen. The object may be the user's hand or a dedicated pointing device like a pen or a ruler. When comparing the camera image with the original image, the covering of the particular option is noticed and an action corresponding with that option is executed by the system. This may be the projection of a next video image in a series of images forming a presentation. In this known system, the camera needs to record the projected video image and the user at the same time in a single frame. This restricts the movements of the user who must remain in the vicinity of the projection screen. Furthermore, the user must cover in the projected image the particular option to indicate the selection of this option. This also requires the user's presence close to that option. Furthermore, the user must take care not to accidentally cover this option or another option on the screen with part of his or her body and must avoid blocking the sight of the camera on the option or options on the screen. So for interaction with the known system, the area in which the user can move and the position of the selectable options are restricted.

SUMMARY OF THE INVENTION

It is an object of the invention to provide a method of the kind set forth with an improved way of determining the pointing by the user. This object is achieved according to the invention in a method further including based on the image determining a feature position of a body feature of the user in 3 dimensional space and wherein the step of ascertaining from the image whether the user has pointed at the particular option is executed on the basis of the feature position of the body feature and the option position of the particular option. Because the determining whether the user points to the particular option is based on an image of the user alone, so without requiring the selectable options to be in that image, the user is given a larger freedom of moving around when compared with the known method. The establishment of the feature position of the body feature of the user in 3 dimensions makes it possible to determine whether or not the user points at the particular option while this option is not in the image. Pointing at an option in the 3 dimensional space, without being required to operate some input device, is a very natural and intuitive way for a user to express a choice. This is especially advantageous for a user who is not familiar with operating a computer. Furthermore, the absence of a dedicated input device and other moving device make the method attractive for application in public places since there is no risk that these devices would be taken away or damaged.

As such, it is known to control an application on the basis of the image of a user person. Patent publication WO 96/30856 describes a system in which the user controls the graphics, e.g. an animated character, on a screen to which the user is looking, by moving one or more body parts. The system is equipped with a camera that takes an image of the user. The silhouette of the user in that image is analyzed and the position and movement of a body part in one or more specific regions in the image are used as input for controlling the graphics. The poses that the user may assume are simply recognizable in the silhouette and do not include pointing towards a presented option. The system analyzes the image of the user in 2 dimensions, only as a silhouette, and no determining of positions of the user's body in 3 dimensions is undertaken. So important differences between this method and the method according to the invention are:

the style of interaction is different: in the known method poses that cause a particular silhouette result in a corresponding command and action in the application whereby there is no natural correspondence between the pose and the resulting action, while the present invention provides for natural pointing to an option that is to be selected;

in the known method, the poses and the position of the body are restricted in order to assure that the silhouette of the respective body parts are in the corresponding regions of the image, while the present invention is very liberal in the position and poses the user may assume;

in the known method the analysis of the poses of the user is carried out in the 2 dimensions of the image only, while in the present invention the poses of the body are determined in the 3 dimensional space in which the user interacts thus providing an interface that is very intuitive to the user since it conforms to the human sense of the world.

The method according to the invention can be employed in various applications where a user interacts with a system. It is used to enter commands into the system, while no separate input device is necessary. Examples are information retrieval systems in community buildings, like libraries, art galleries and museums, and shopping systems in public shopping areas, like shopping malls, warehouse shops and department stores. Further applications include public service facilities, such as fast-food providers where the user can point at a desired food item, and private in-home uses, such as interaction with a home-theater system.

In an embodiment of the method according to the invention the set of selectable objects is displayed on a video screen facing the user. Displaying the selectable options on a screen provides for a flexible way of displaying these options to the user. The displaying can then easily be adapted to the current user who is making a selection: the height of the displayed options can be matched with the height of the user standing in front of the screen and the size of the displayed options on the screen can be adapted to the distance at which the user is standing from the screen. Furthermore, a system employing this method can easily be maintained since modifying the set of selectable options on the screen is easier and less expensive then modifying a hardware setup of the set of selectable options.

In an embodiment of the method according to the invention the body feature is the pointing end of an arm of the user. Allowing the user to point with one or more fingers or with a hand provides for a very natural, intuitive way of pointing. The end of the pointing arm, i.e. the fingers or the hand is recognizable from the image and the position can be calculated.

An embodiment of the method according to the invention further comprises based on the image determining a foot position of a foot of the user, a projection of the arm of the user on the plane of the image and a long axis of the body of the user on the plane of the image. In this embodiment the determining of the feature position includes:

determining the distance between the option position of the particular option and the foot position;

determining a first angle between the projection of the arm of the user and the projection of the long axis of the body of the user; and determining a second angle between the arm of the user and the plane of the image on the basis of an estimated arm length of the arm of the user and a determined length of the projection of the arm. The steps of determining the distance between the body and the particular option, on the basis of the foot position, and of determining the position of the pointing body feature with respect to the body, on the basis of the two angles of the pointing arm, have proven a reliable way for determining the position of this pointing body feature in the 3 dimensional space.

An embodiment of the image retrieval system according to the invention includes an initialization step in which the height of the user is determined. In this embodiment the estimated arm length is obtained from biometrics data on the basis of the height of the user. Obtaining an estimation for the required arm length from biometrics data has been proven to be adequate. Such biometrics data are the result from measurements of many different persons collected over the years which are accessible at many places, e.g. at a public library.

It is a further object of the invention to provide a system of the kind set forth with an improved mechanism of determining the pointing by the user. This object is achieved according to the invention in a system having a feature determining unit for based on the image determining a feature position of a body feature of the user in 3 dimensional space and wherein the ascertaining unit is arranged to ascertain whether the user points at the particular option on the basis of the feature position of the body feature and the option position of the particular option.

Because the system determines whether the user points to the particular item on the basis of the image of the user, in particular by determining the feature position of the pointing body feature in 3 dimensions, there is a large flexibility for the position and the pose of the user while pointing. Furthermore, interaction with the system is in a non-contact way, i.e. there are no buttons to push or pointing devices to operate. This makes the system robust and fit for use in public places since there is little risk for parts of the system being taken away or damaged.

An embodiment of the system according to the invention has a video screen facing the user for displaying the set of selectable objects. The video screen for displaying the set of selectable options makes the system easy to maintain. Changing the contents or appearance of the set is realized by modifying the software generating the images on the screen and does not require modification of any hardware parts of the system.

Further advantageous embodiments of the invention are recited below.

BRIEF DESCRIPTION OF THE DRAWINGS

The invention and its attendant advantages will be further elucidated with the aid of exemplary embodiments and the accompanying schematic drawings, whereby.

Corresponding features in the various FIGURES are denoted by the same reference symbols.

DESCRIPTION OF THE PREFERRED EMBODIMENTS

Figure 1:
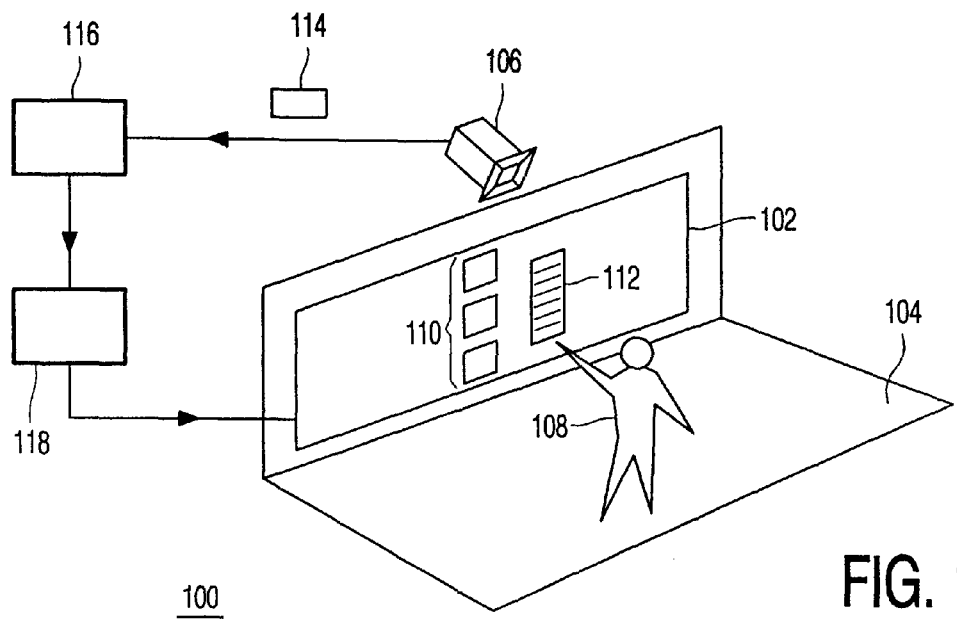
FIG. 1 schematically shows a system according to the invention.

FIG. 1 schematically shows a system according to the invention. The system 100 has a video screen 102 of 2×3 m and an interaction area 104. The system has a camera 106 that takes an image of a user person 108 standing in the interaction area in front of the video screen. The system displays a set of selectable options 110 on the video screen and the user selects an option by pointing at it. The system is arranged to display an additional object 112 with an explanation of the selectable options or other supporting information, if such is applicable. The camera image 114 taken of the user is analyzed in a vision recognition part 116 of the system. This vision recognition part determines the current pose of the user and calculates the position of the pointing hand of the user in the 3 dimensional space. In an application part 118 of the system, the 3 dimensional data is used to determine whether the user points at one of the selectable options displayed on the video screen. The application part bases its calculations on the position of the pointing hand of the user, which is received from the vision recognition part, and on the respective positions of the selectable options, which are known since the application part has generated the display of the options. Based on the particular option being selected, the application part executes a corresponding action. If the selected option is a selection in a menu hierarchy, then the action is the display of a new set of selectable options representing the next level in the menu hierarchy. If the selected option represents a request for a specific information item, then the action is the retrieval of this information item and the subsequent display of the information item on the video screen.

Selecting an option is done in two stages. In a first stage, the user points at the desired option and in the second stage the user confirms that this is the desired options. This two stage approach avoids the risk of an undesired selection and is comparable to the point and click approach used for a mouse. In the present embodiment of the system according to the invention, the confirmation is implemented by having the user maintain the pointing at the desired option for a predetermined period. When this period has lapsed, the system acknowledges the confirmation by the user and executes the corresponding action. Alternative ways of confirmation are envisaged and are currently under consideration. A first alternative is that the user circles the desired option with his or her finger. When the user completes the circle, the confirmation has taken place and the desired option is selected. A second alternative is to use speech input for confirmation. The user then utters "That one", while pointing to the desired option. Uttering of that phrase constitutes the confirmation and the desired option is selected.

Figure 2:
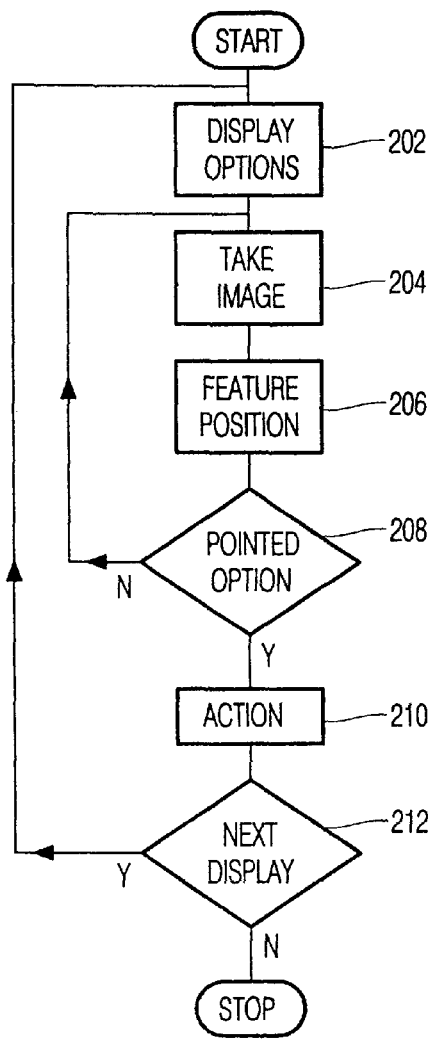
FIG. 2 shows a flowchart with the major steps of the method according to the invention.

FIG. 2 shows a flowchart with the major steps of the method according to the invention. In a step 202 the selectable options are displayed on the video screen and subsequently in step 204 an image is taken from the user standing in front of the screen in the interaction area. The camera of the system continuously records the scene in the interaction area and at a suitable moment the system grabs a single image for analysis. In step 206, this image is analyzed and the position of the pointing hand of the user in the 3 dimensional space of system is determined. This step 206 is further detailed below in FIGS. 3 and 4. Then step 208 checks whether the user in the image points at a particular option. If such is not the case, processing is returned to step 204 where a new image is grabbed and the process is repeated. If it is concluded in step 208 that the user is pointing at a particular option then the action corresponding with that option is executed in step 210. Then in step 212 it is checked whether a next video image with a new set of selectable option is to be displayed on the video screen. If such is the case, the process returns to step 202 for displaying this video image and the subsequent steps are then carried out accordingly for this new video image. It is to be noted that the flowchart of FIG. 2 only shows the major steps of the invention. In reality the invention comprises more detailed process and control steps which have been omitted for the sake of clarity.

Figure 3:
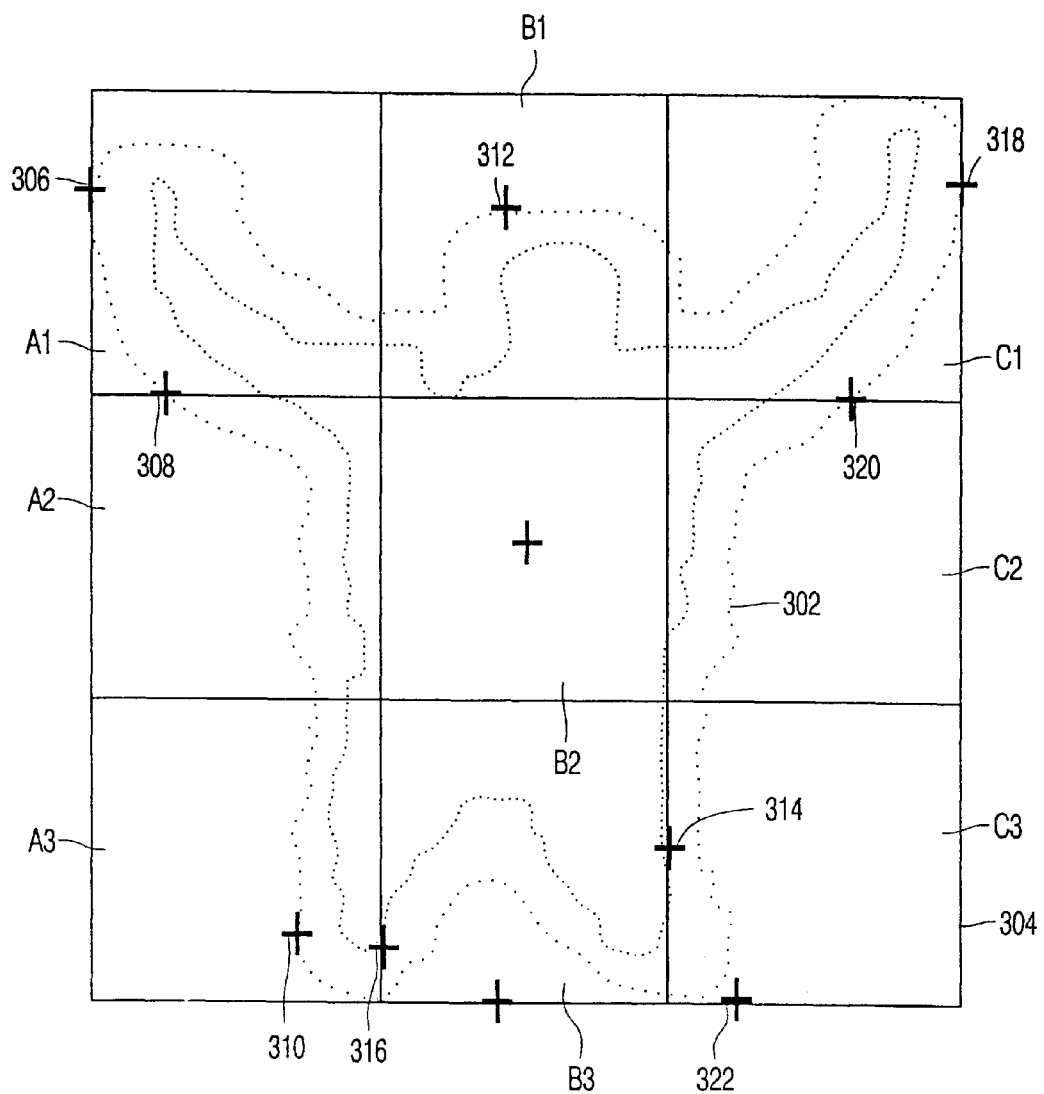
FIG. 3 shows an intermediate result of the analysis of the image taken by the camera.

FIG. 3 shows an intermediate result of the analysis of the image taken by the camera. In a first step processing the image taken by the camera, a body contour 302 of the user standing in front of the video screen is obtained. This first processing step is not an essential element of the present invention and is not further detailed in the present patent document for the sake of brevity. The processing step of obtaining the body contour is described by Darrel T., Wren C., Azarbayejani A. and Pentland A, in, "Pfinder Real-time tracking of the human body", IEEE Transactions on Pattern Analysis and Machine Intelligence, Vol. 19, No. 7, July 1997, pages 780-785. In a next step, a bounding box 304 is determined that encloses the body contour. The bounding box 304 is divided into 9 cells, by dividing the box into 3 horizontal, mutually equal-sized rows and into 3 vertical, mutually equal-sized columns. The three columns are labelled from left to right by A, B and C respectively and the three rows are labelled from top to bottom by 1, 2 and 3 respectively. The body contour is analyzed per cell in order to recognize various features of the body of the user. The following measurements are made for the respective cells, whereby (x,y) denotes the location in the image where x runs from left to right and y from bottom to top:

| | | |
|---|---|---|
| A1: (x,y) for MIN (x) | B1: (x,y) for MAX (y) | C1: (x,y) for MAX (x) |
| A2: (x,y) for MIN (x) | B2: nothing | C2: (x,y) for MAX (x) |
| A3: (x,y) for MIN (x) | B3: (x,y) for MAX (x) and (x,y) for MIN (x) | C3: (x,y) for MAX (x) |

Depending on the body contour, not all measurements need to exist. In FIG. 3, the obtained measurements are indicated as plus-signs, with the following reference numerals per cell:

| | | | | | |
|---|---|---|---|---|---|
| A1: | 306 | B1: | 312 | C1: | 318 |
| A2: | 308 | B2: | (none) | C2: | 320 |
| A3: | 310 | B3: | 314 and 316 | C3: | 322 |

Various body features are identified on the basis of the above measurements. This identification is given below per body feature in pseudo code, in which the //-sign indicates comments to relevant line of pseudo code.

RightHand:
  If (A1-measurements exists) Then // right hand over shoulder position
    RightHand=A1-measurement
  Else // right hand under shoulder
  If (A2-measurement exists) Then
    RightHand=A2-measurement
  Else // right hand not visible in this image
    RightHand=Invalid
LeftHand:
  If (C1-measurements exists) Then // left hand over shoulder position
    LeftHand=C1-measurement
  Else // left hand under shoulder
  If (C2-measurement exists) Then
    LeftHand=C2-measurement
  Else // left hand not visible in this image
    LeftHand=Invalid
Head:
  If (B1-measurement exists) Then
    Head=B1-measurement
  Else // head not visible in this image
    Head=Invalid
RightFoot:
  If (A3-measurement exists) Then // feet spread apart
    RightFoot=A3-measurement
  Else // feet together
  If (B3-MIN(x)-measurement exists Then
    RightFoot=B3-MIN(x)-measurement
  Else // right foot not visible in this image
    RightFoot=Invalid
LeftFoot:
  If (C3-measurement exists) Then // feet spread apart
    LeftFoot=C3-measurement
  Else // feet together
  If (B3-MAX(x)-measurement exists Then
    LeftFoot=B3-MAX(x)-measurement
  Else // left foot not visible in this image
    LeftFoot=Invalid Furthermore a number of additional body features are identified. A center feature is identified at the center of the bounding box 304 and a base feature is identified at the bottom center of the bounding box. A left and a right shoulder feature are identified at respective fixed x- and y-offsets from the Head feature.

The division of the bounding box into 9 cells makes it possible to resolve the pose in which the user holds a hand above his or her head. When the single bounding box 304 would be used, the highest location found in the box would assumed to be the head. This would definitely lead to a wrong determination of the direction in which the user is pointing.

Figure 4:
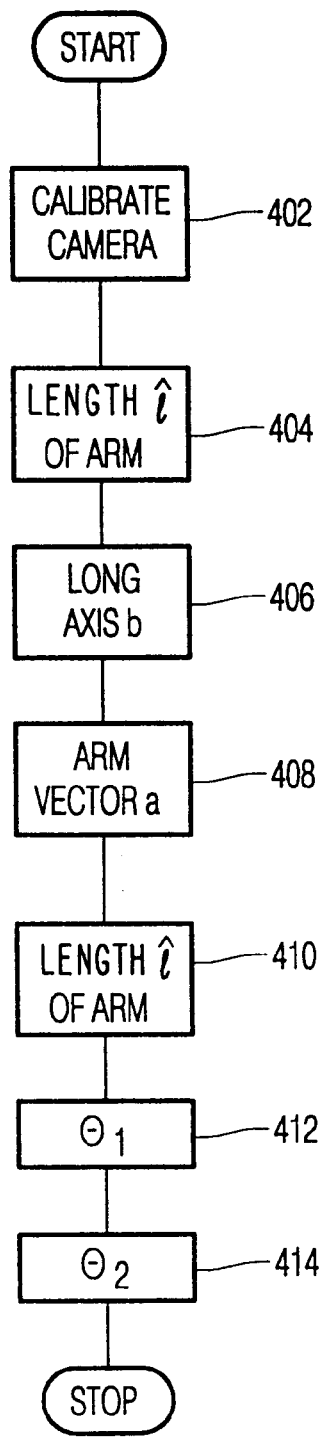
FIG. 4 shows the steps for calculating the position of the pointing hand.

FIG. 4 shows the steps for calculating the position of the pointing hand. These steps are based on the features as calculated above in conjunction with FIG. 3. Step 402 is a step for camera calibration which must be executed when the camera is not positioned directly in front of the user. The output of the camera calibration step is a 4×4 matrix that represents the rotations and translations by which the camera position and orientation is related to the co-ordinate frame of the system. This co-ordinate frame has the X- and Z-axis on the floor and the Y-axis up. The image as taken by the camera is transformed to the XY-plane using the camera calibration matrix. The transformed image is the image that would have been taken by a camera positioned directly in front of the user. So, the camera calibration matrix is used to determine the actual 3 dimensional position of the foot and the related positions of head and hands in the XY-plane, no matter what angle the camera is at. The following steps below operate on the image after it has been transformed to the XY-plane for taking into account the camera position.

In step 404, the full length l of the arm of the user is obtained. This is the actual length of the arm and not the length as appearing in the image. First the height of the user is calculated from the head feature and the base feature of the body contour in the image. Assuming that the user is standing on the floor, the distance between the camera and the user's position is determined by the position of the base feature in the image. Given this distance, the height of the body contour can now be scaled to the actual height of the user. Next the system obtains an estimate for the actual arm length of the user from a table of biometrics data. These biometrics data have been determined from statistical data of measurements of many persons and can be used to estimate various body dimensions of a person, given the height of that person. In step 406 a vector b is defined for the long axis of the body of the user. Vector b has a direction from the base feature to the head feature and is given a length of one unit. In step 408 a vector a is defined for the pointing arm of the user. A shoulder position is obtained from the table of biometrics data as a given offset from the position head feature. Vector a has a direction from the shoulder position to the position of the hand and is given a length of one unit. In step 410 the length $\hat{l}$ of the arm of the user as appearing in the image is measured. The arm in the image is a projection of the real 3 dimensional arm onto the image and is shorter than the full, real length l due to the foreshortening of the projection.

Finally in steps 412 and 414 the position of the hand is calculated on the basis of the data obtained above. In step 412, the angle $\Theta_1$ between vector a and vector b is calculated using the equation:

$$\Theta_1 = \cos^{-1}(a.b) \tag{1}$$

This simple relation is true since a and b are vectors of unit length. Vectors a and b are both in the plane of the image and so is the angle $\Theta_1$. In step 414 the angle $\Theta_2$ between the pointing arm of the user and the plane of the image is calculated using the equation:

$$\Theta_2 = \cos^{-1}(\hat{l}/l) \tag{2}$$

As described above, the length l is the true length of the arm whereas the length $\hat{l}$ is the length of the arm as seen in the image. The more the arm is pointing out of the plane of the image, the shorter will be the length $\hat{l}$. This is according to equation (2) above.

Now, given the shoulder position, the angle $\Theta_1$, the angle $\Theta_2$ and the arm length l, the position of the hand is fully determined in the three dimensions of the coordinate frame of the system. Subsequently this hand position is used to determine at what option the user is pointing. It is to be noted that the measurements and the calculations of the steps 404 to 414 are carried out on the image of the user after it has been transformed to the XY-plane. This transformation is carried out for taking into account that the camera is not positioned directly in front of the user. If the camera would be directly in front of the user, the transformation need not be performed.

Figure 5:
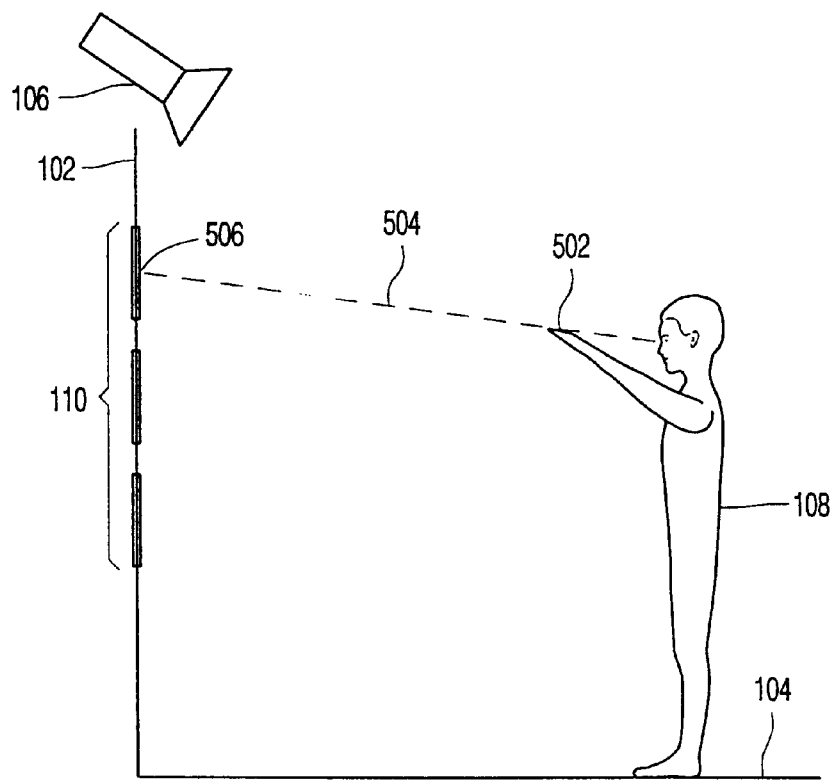
FIG. 5 shows the determination of the pointed option on the basis of the hand position.

FIG. 5 shows the determination of the pointed option on the basis of the hand position. This FIG. 5 shows in side view, video screen 102 with the selectable options 110 and the user 108 standing on the interaction area 104. The position of a pointing hand 502 is calculated on the basis of the image taken by the camera 106. In the present embodiment, to determine at which option the user is pointing an interception line 504 is determined through the eye of the user and the hand of the user. The position of the eye is a given offset from the position of the head feature and is obtained from the table of biometrics data. Given the known positions of the eye and the hand of the user and the position of the video screen, the interception point 506 between the line 504 and the video screen 102 is calculated. The distance between the user, represented by a foot position, and the selectable object, displayed on the video screen, is calculated according to the steps above. From the comparison of this interception point 506 with the known position of the selectable option, it can easily be determined at which option the user is pointing, if any. Alternatives exists for the definition of the interception line 504, e.g. the line through the shoulder and the hand of the user so coinciding with the pointing arm of the user.

Figure 6:
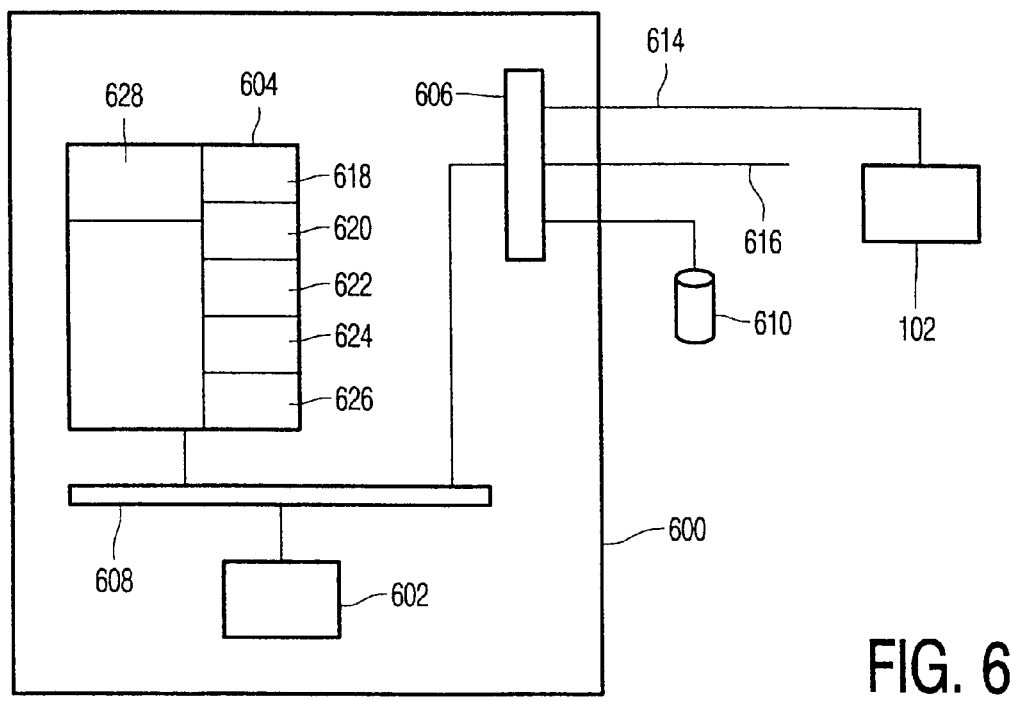
FIG. 6 shows the most important components of the system according to the invention.

FIG. 6 shows the most important components of the system according to the invention. The system 600 is implemented according to a known architecture and can be realized on a general purpose computer. The system has a processor 602 for carrying out instructions of an application program loaded into working memory 604. The system further has an interface 606 for communication with peripheral devices.

There is a bus 608 for exchange of commands and data between the various components of the system. The peripherals of the system include a storage medium 610 containing the executable programs. The storage medium 610 is a magnetic hard disk but can alternatively be realized as various separate devices, potentially of different kind of storage device. Application of the invention is not restricted by the type of device and storage devices which can be used include optical disk, magnetic disk, tape, chip card, solid state or some combination of these devices. The system further has an output 614 for sending a video image with the selectable options to the video display screen. Furthermore, the system has an input 616 for receiving a video taken by the camera.

In order to carry out the various tasks, a number of software units are loaded into the working memory 604, among which are the following:

an initialization unit 618 for determining the height of the user;

feature determining unit 620 for based on the image determining a feature position of a body feature of the user in 3 dimensional space;

further determining unit 622 for based on the image determining a foot position of a foot of the user, a projection of the arm of the user on the plane of the image and a long axis of the body of the user on the plane of the image;

ascertaining unit 624 for ascertaining from the image whether the user points at the particular option; and concluding unit 626 for concluding that the user has selected the particular option, in the case that the ascertaining means have ascertained that the user points at the particular option.

Furthermore, the working memory 604 has memory space 628 for temporarily storing input and output data and intermediate results, like the body contour and the positions of the various body features in the image being analyzed by the system.

The invention has been presented in a system wherein the user points with his or her arm to an option presented on a relatively large video screen. It is to be understood that the invention can also be applied in system of smaller size. An example is a Personal Computer where the selectable options are displayed on the relatively small computer monitor and where a user is allowed to point with a finger to the desired option. Then in a similar way as described above, the option at which the user points is determined by calculating the 3 dimensional position of the finger tip and by relating this to the respective positions of the selectable options displayed on the monitor.

What is claimed is:

1. A method for enabling a user to select a particular option from a set of selectable options, the method comprising:

displaying the set of selectable options at respective option positions;

taking an image of the user while allowing the user to physically point at the particular option;

determining a foot position of a foot of the user, a projection of an arm of the user on the plane of the image and a long axis of the body of the user on the plane of the image based on the image;

ascertaining from the image whether the user points at the particular option;

if such is the case, concluding that the user has selected the particular option; and based on the image, determining a feature position of a body feature of the user in 3 dimensional space by determining the distance between the option position of the particular option and the foot position, determining a first angle between the projection of the arm of the user and the projection of the long axis of the body of the user, and determining a second angle between the arm of the user and the plane of the image on the basis of an estimated arm length of the arm of the user and a determined length of the projection of the arm, wherein the estimated arm length is obtained from biometrics data on the basis of the height of the user, and wherein ascertaining from the image whether the user has pointed at the particular option is executed on the basis of the feature position of the body feature and the option position of the particular option.

2. A method as claimed in claim 1, wherein the first angle between the projection of the arm of the user and the projection of the long axis of the body of the user is a projection of the arm of the user and a projection of the long axis of the body taken at an eye level of the user.

\* \* \* \* \*